Oct. 27, 1953

L. C. DUKES 2,656,993

FISHING REEL

Filed March 27, 1950

Lester C. Dukes
INVENTOR.

BY *Clarence A. O'Brien*
*and Harvey B. Jacobson*
Attorneys

Oct. 27, 1953
L. C. DUKES
2,656,993
FISHING REEL
Filed March 27, 1950
2 Sheets-Sheet 2
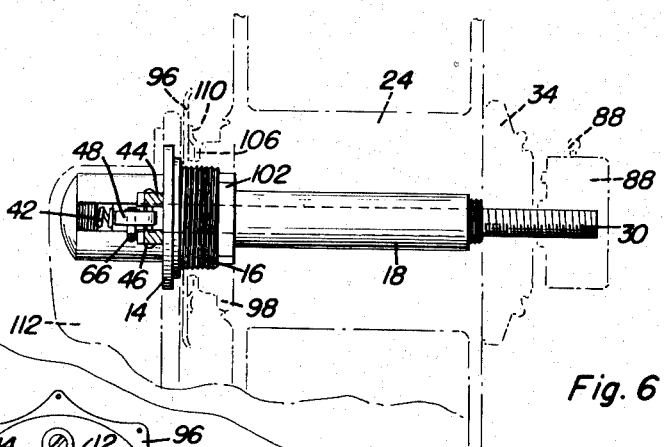
Fig. 6
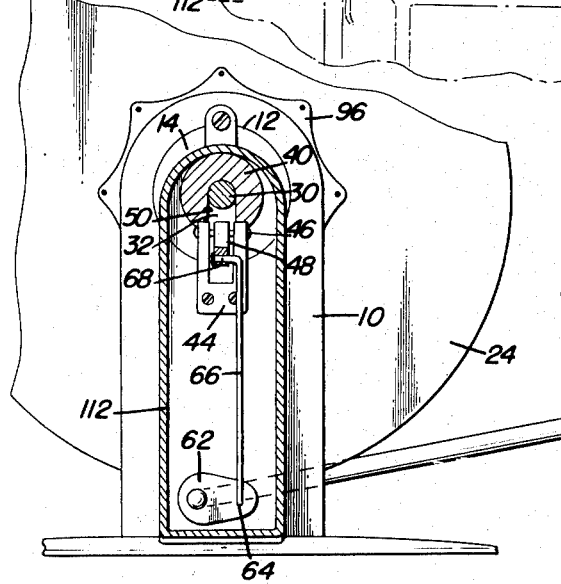
Fig. 7
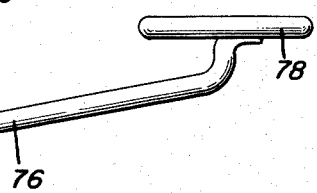
Fig. 8
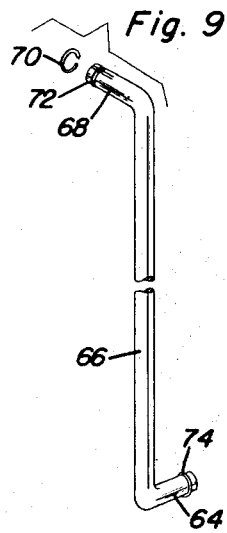
Fig. 9
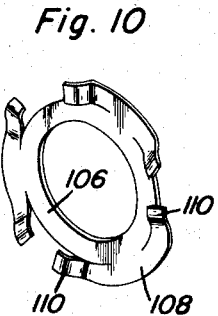
Fig. 10
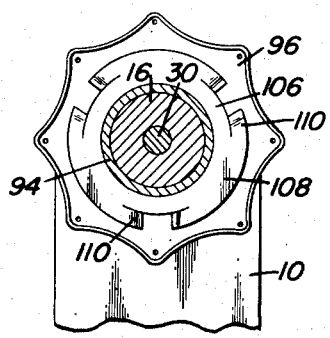
Lester C. Dukes
INVENTOR.
BY *Clarence A. O'Brien*
*and Harvey B. Jacobson*
Attorneys Patented Oct. 27, 1953

2,656,993

UNITED STATES PATENT OFFICE 2,656,993

FISHING REEL

Lester C. Dukes, Seattle, Wash.

Application March 27, 1950, Serial No. 152,211

4 Claims. (Cl. 242—84.5)

1

This invention relates to new and useful improvements in fishing reels and the primary object of the present invention is to provide a fishing reel including a line holding spool and novel and improved brake means for arresting rotation of the spool.

Another important object of the present invention is to provide a fishing reel including a manually adjustable drag means for effectively reducing the rotation of the line holding spool of the reel.

Another object of the present invention is to provide a flashing reel having a finger operated brake actuating mechanism that is located close to the hand grip of a fishing rod to permit convenient activation of the brake actuating mechanism.

Yet another object of the present invention is the provision of a fishing reel the parts of which are quickly and readily assembled or disassembled in a convenient manner for inspection, repair or replacement of parts.

A further object of the present invention is to provide a fishing reel that is so constructed as to permit the line holding spool thereof to be freely rotated and thereby allow the line on the spool to be played out unrestrictedly.

A still further aim of the present invention is to provide a fishing reel that is simple and practical in construction, strong and reliable in use, durable and efficient in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 6 is a plan view of the spool mounting and with the other parts of the reel shown in dotted lines;

Figure 7 is an enlarged side elevational view of the reel and with parts broken away and shown in section;

Figure 8 is a detail sectional view taken substantially on the plane of section line 8—8 of Figure 2;

Figure 9 is a group perspective view of the cam operating link used in the present invention; and, Figure 10 is a perspective view of the spring washer used in the present invention.

Figure 1:
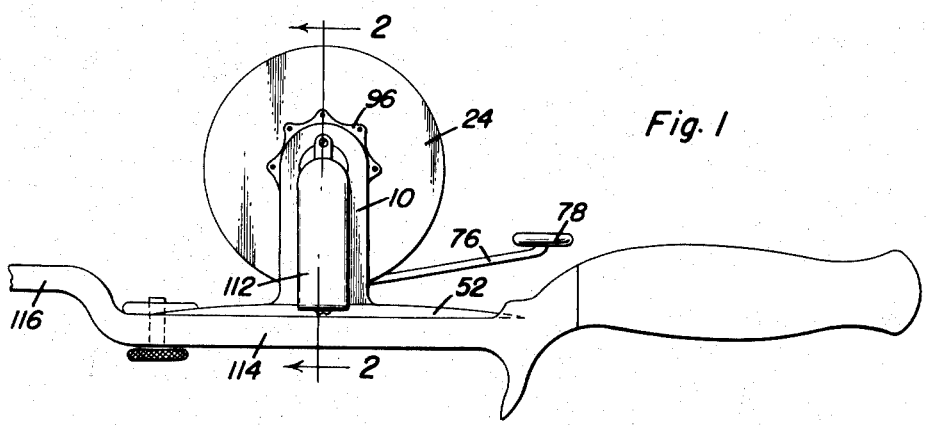
Figure 1 is a side elevational view of the present reel applied to a fishing rod.
Figure 3:
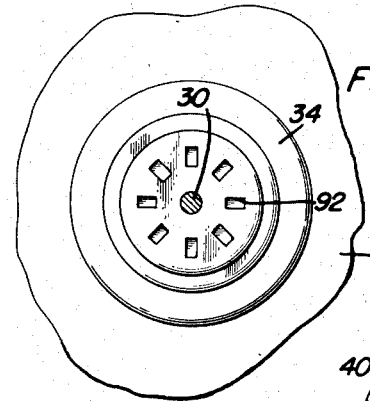
Figure 3 is a detail sectional view taken substantially on the plane of section line 3—3 of Figure 2.

Referring now to the drawings in detail, wherein for the purpose of illustration, there is disclosed a preferred embodiment of the present invention, the numeral 10 represents a substantially L-shaped frame whose longer leg is provided with a stepped opening 12 that receives a stepped collar 14 on the enlarged externally threaded portion 16 of an elongated spindle 18 having an axial bore 20.

Figure 2:
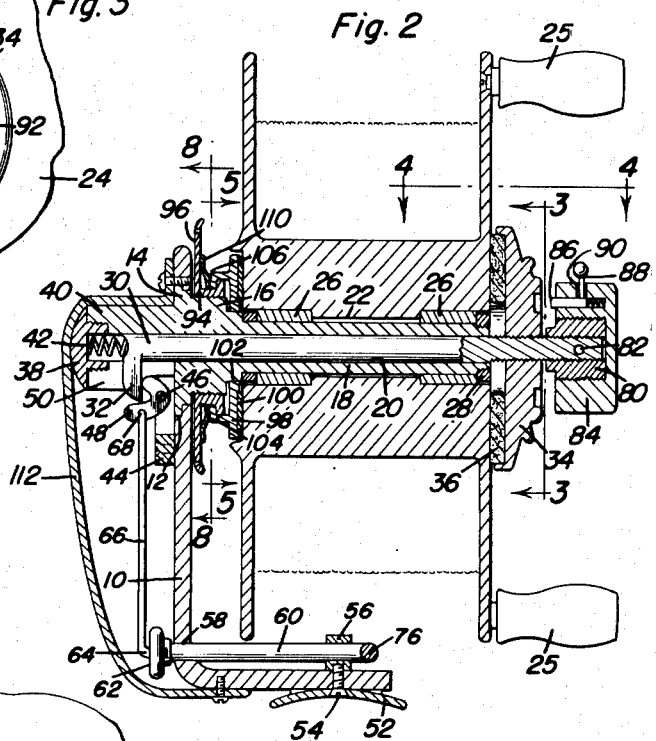
Figure 2 is an enlarged vertical sectional view taken substantially on the plane of section line 2—2 of Figure 1.

The axial bore 22 in a spool or drum 24, having finger grips 25 journaled thereon, receives the spindle 18. Bearings 26 embrace the spindle 18 and are received in recesses formed in the wall of the bore 22. A retaining nut 28 is threaded on the spindle to retain the spool on the spindle as shown in Figure 2.

The bore 20 in the spindle 18 slidably receives a brake supporting and actuating shaft 30 having a laterally projecting finger 32 at one end. The other end of the shaft 30 extends outwardly from the spindle 18 and is externally threaded to receivably engage an internally threaded aperture in a brake member 34. The inner face of the brake member 34 is provided with a recess in which there is suitably held a friction washer or brake lining 36.

Means is provided for urging the shaft 30 and the brake member 34 to a brake releasing position. This means consists of an end cap 38 that is threaded into the end 40 of the spindle remote from the brake member 34. The cap 38 is provided with a central recess that receives a coil spring 42. The spring bears against the shaft 30.

Means is also provided for moving the shaft 30 and the brake member 34 to a brake applying position. This means includes a bifurcated member 44 that is detachably secured to the longer leg of the frame 10. The furcations of the member 44 support a pivot 46 that is disposed transversely of and beneath the shaft 30. The apex of a substantially V-shaped cam 48 is apertured to receive the pivot 46 and the cam 48 is movable into and out of a longitudinal slot 50 provided in the end 40 that slidably receives the finger 32. The cam 48 also contacts the inner edge of the finger 32 as shown in Figure 2.

A reel seat 52 is secured to the shorter leg of the frame 10 by a fastener or fasteners 54 that also attach a bearing sleeve 56 to the shorter leg of the frame 10. The bore in the sleeve 56 registers with an opening 58 in the longer leg of the frame 10 and the sleeve 56 and opening 58 cooperate in rotatably supporting a lower brake actuating shaft or rod 60.

A lever or arm 62 is attached to the end of the rod 60 that projects outwardly from the opening 58 and pivotally receives the lower laterally projecting end 64 of a connecting arm or pitman 66. The upper laterally projecting end 68 of the arm 66 extends through the lower leg of the cam 48 and is held in place by a split, resilient ring 70 that enters a groove 72 in the end 68. The end 64 is also held in place to the arm 62 by a split ring 74 that enters a groove in the end 64.

The rod 60 is provided with a perpendicular extension 76 that is bent to form a finger grip 78. As the grip 78 is pressed downwardly, the rod 60 is rotated to lower the arm 66 and pivot the cam 48 against the finger 32 whereupon the shaft 30 and the brake member 34 are moved against action of the spring 42 and the lining 36 is forced against the spool 24 to hold the spool against rotation.

In order to prevent back rotation of the brake member on the threaded end of the shaft 30, there is provided a nut 80 that is threaded on the threaded end of the shaft 30. The nut 80 is keyed to the shaft 30 by a pin 82 or the like. A cap 84 is threaded on the nut 80 and includes an eccentric recess paralleling the shaft 30 that slidably receives a spring urged dog 86 having a laterally projecting finger piece 88. The finger piece 88 is movable in a bayonet slot 90 in the cap 84 that communicates with the recess receiving the dog.

Figure 4:
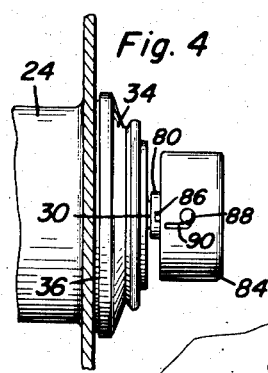
Figure 4 is a detail sectional view taken substantially on the plane of section line 4—4 of Figure 2.
Figure 5:
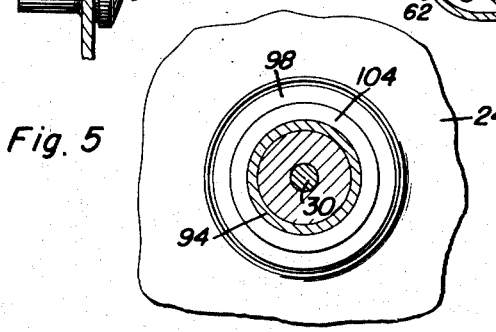
Figure 5 is a detail sectional view taken substantially on the plane of section line 5—5 of Figure 2.

The dog 86 is urged to a position for engaging one of a plurality of recesses 92 in the ratchet face of the brake member 34 and is held retracted by positioning the finger piece 88 in the offset of the bayonet slot 90 as shown in Figures 2 and 4.

Drag means is provided for reducing the rotation of the spool on its supporting spindle 18. This means comprises a collar 94 that is threaded on the portion 16 and which includes flanges at its ends. One of the flanges 96 is enlarged and includes a plurality of circumferentially spaced recesses in its circumference to permit the same to be manually grasped for adjustment of the collar 94 on the portion 16.

A friction member 98 supporting a brake lining 100 on its inner face includes a central opening that receives a shoulder 102 on the spindle 18. The shoulder 102 includes at least two parallel edges and the opening in the member 98 also includes at least two parallel edges complemental to the parallel edges of the shoulder 102 so that the member 98 may slide on the spindle but will be held against rotation relative to the spindle.

The member 98 includes a flanged portion 104 that embraces the collar 94 and which is slidable between the end flanges of the collar 94. A spring member or washer 106 is provided on its outer edge with a plurality of circumferentially spaced arcuate arms 108 having offsets 110 at their ends. The washer 106 embraces the collar 94 and is received between the flange 96 and the flanged portion 104 to yieldingly urge the member 98 toward the spool 24.

By rotating the collar 94 on the portion 16, more specifically adjusting the collar 94 toward the spool, a predetermined pressure is exerted against the spool 24 by the member 98 including the lining 100.

A casing or shield 112 is detachably secured to the frame 10 to protect the cam 48, the arm 66 and the link 62 and also tends to strengthen and reinforce the frame 10 and holds the spindle in place.

The present reel is installed on the reel support 114 of a fishing rod 116 with the reel seat 52 secured to the support 114 in the usual manner, as shown in Figure 1 of the drawings.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing reel comprising a frame, means carried by the frame for attaching the frame to a fishing pole, a spindle supported on the frame and having an axial bore, a spool journaled for rotation on the spindle, a supporting shaft slidably mounted in the axial bore in said spindle, a brake member carried by and movable with said shaft for engaging the spool to arrest rotation of the spool, a cam pivoted on said frame and engaging said shaft, a rod journaled on said frame and paralleling said shaft, a connection between said cam and said rod, and means attached to said rod for rotating the rod and thereby pivot the cam and move the shaft and the brake member to a brake applying position.

2. A fishing reel comprising a frame, means carried by the frame for attaching the frame to a fishing pole, a spindle supported on the frame and having an axial bore, a spool journaled for rotation on the spindle, a supporting shaft slidably mounted in the axial bore in said spindle, a brake member carried by one end of the shaft and movable with said shaft for engaging the spool to arrest rotation of the spool, resilient means carried by the spindle and retained in the bore and engaging the end of said shaft remote from said brake member and yieldingly urging the shaft and the brake member to a brake releasing position, said shaft including a laterally projecting finger, and means mounted on the frame and connected to the shaft for moving the shaft and the brake member to a brake applying position, said last named means including a cam pivoted to said frame and having an axis of rotation disposed transversely of said shaft, said cam engaging said finger.

3. The combination of claim 2 wherein said brake member is threaded on said shaft, and means mounted on said shaft and engaging said brake member to lock said brake member against back rotation on said shaft.

4. A fishing reel comprising a frame, means carried by the frame for attaching the frame to a fishing pole, a spindle supported on the frame and having an axial bore, a spool journaled for rotation on the spindle, a supporting shaft slidably mounted in the axial bore in said spindle, a brake member carried by and movable with said shaft for engaging the spool to arrest rotation of the spool, means carried by the spindle engaging the shaft and yieldingly urging the shaft and the brake member to a brake releasing position, means mounted on the frame and connected to the shaft for moving the shaft and the brake member to a brake applying position, said brake member being threaded on said shaft, and means mounted on said shaft and engaging said brake member to lock said brake member against back rotation on said shaft, said means for locking said brake member against back rotation including a cap on said shaft, a spring urged dog carried by said cap, and said brake member having a ratchet face for engaging said dog.

LESTER C. DUKES.

References Cited in the file of this patent

UNITED STATES PATENTS

| Number | Name | Date |
|---|---|---|
| 485,208 | Mount | Nov. 1, 1892 |
| 1,240,677 | Cook | Sept. 18, 1917 |
| 1,325,264 | Pemberton | Dec. 16, 1919 |
| 1,353,816 | Abbott, Jr. | Sept. 28, 1920 |
| 1,984,272 | Krohn | Dec. 11, 1934 |
| 2,129,903 | Benson | Sept. 13, 1938 |
| 2,190,984 | Gulbrandsen | Feb. 20, 1940 |
| 2,303,645 | Lacy | Dec. 1, 1942 |
| 2,329,381 | Bannister | Sept. 14, 1943 |
| 2,548,174 | Rastler | Apr. 10, 1951 |